United States Patent
Teng et al.

(10) Patent No.: US 11,619,446 B2
(45) Date of Patent: Apr. 4, 2023

(54) MICROWAVE DRYING DEVICE AND PROCESSING BOX THEREOF

(71) Applicant: WAVE POWER TECHNOLOGY INC., Toufen (TW)

(72) Inventors: Hsuan-Hao Teng, Taichung (TW); Ming-Hsiung Tsao, Zhubei (TW); Han-Ying Chen, Zhubei (TW)

(73) Assignee: Wave Power Technology Inc., Miaoli County (TW)

( * ) Notice: Subject to any disclaimer, the term of this patent is extended or adjusted under 35 U.S.C. 154(b) by 452 days.

(21) Appl. No.: 17/014,211

(22) Filed: Sep. 8, 2020

(65) Prior Publication Data

US 2022/0074659 A1 Mar. 10, 2022

(51) Int. Cl.
*F26B 3/347* (2006.01)
*F26B 15/10* (2006.01)
*H05B 6/64* (2006.01)
*H05B 6/80* (2006.01)
*H05B 6/78* (2006.01)
(Continued)

(52) U.S. Cl.
CPC .............. *F26B 3/347* (2013.01); *F26B 15/10* (2013.01); *H05B 6/642* (2013.01); *H05B 6/6402* (2013.01); *H05B 6/78* (2013.01); *H05B 6/80* (2013.01); *F26B 25/008* (2013.01); *F26B 25/12* (2013.01); *H05B 2206/044* (2013.01)

(58) Field of Classification Search
CPC ........ F26B 3/347; F26B 15/10; F26B 25/008; F26B 25/12; F26B 13/10
See application file for complete search history.

(56) References Cited

U.S. PATENT DOCUMENTS

| 3,589,022 A * | 6/1971 | Hering, Jr. .......... B41F 23/0493 219/757 |
| 5,422,463 A * | 6/1995 | Gooray ................. H05B 6/645 219/696 |
| 9,849,708 B1 | 12/2017 | Ernst et al. |

(Continued)

FOREIGN PATENT DOCUMENTS

| CN | 101448348 A | 6/2009 |
| CN | 101581534 A | 11/2009 |

(Continued)

*Primary Examiner* — David J Laux
(74) *Attorney, Agent, or Firm* — Rosenberg, Klein & Lee

(57) ABSTRACT

A microwave drying device has a processing box. Two mounting openings are formed on an external mounting wall of the processing box. Two suction partitions are mounted in the processing box and divide an inner space of the processing box into a microwave drying space and two suction spaces. The microwave drying space is located between and connects to the two suction spaces. Multiple channel partitions are mounted in the microwave drying space to form a meandering wave travelling channel. Two opposite ends of the wave travelling channel connect to the two mounting openings respectively. Two microwave emitting modules are mounted on the external mounting wall and emit microwaves toward the two mounting openings respectively. Multiple openings are formed in the processing box such that a film can travel through the processing box. Therefore, drying speed is greatly increased, and the drying device is more compact.

15 Claims, 8 Drawing Sheets

(51) Int. Cl.
*F26B 25/12* (2006.01)
*F26B 25/00* (2006.01)

(56) References Cited

U.S. PATENT DOCUMENTS

| | | | |
|---|---|---|---|
| 2010/0126035 A1* | 5/2010 | Kobayashi | F26B 15/143 |
| | | | 34/259 |
| 2011/0241263 A1 | 10/2011 | Takagi | |
| 2018/0270916 A1 | 9/2018 | Kimrey, Jr. | |

FOREIGN PATENT DOCUMENTS

| | | |
|---|---|---|
| CN | 205279700 U | 6/2016 |
| CN | 206131670 U | 4/2017 |
| CN | 108633122 A | 10/2018 |
| CN | 109780843 A | 5/2019 |
| CN | 110160337 A | 8/2019 |
| CN | 110186253 A | 8/2019 |
| CN | 210220540 U | 3/2020 |
| CN | 111141120 A | 5/2020 |
| DE | 19624610 A1 | 1/1998 |
| GB | 1173816 A | 12/1969 |
| JP | S484668 Y1 | 2/1973 |
| JP | 4981953 A | 8/1974 |
| JP | S56157591 U | 11/1981 |
| JP | H07192864 A | 7/1995 |
| JP | H07195683 A | 8/1995 |
| JP | 2004071520 A | 3/2004 |
| JP | 2013-88039 A | 5/2013 |
| JP | 2013088039 A | 5/2013 |
| KR | 10-2018-0047092 A | 5/2018 |
| KR | 20190061304 A | 6/2019 |
| TW | I641791 B | 11/2018 |

* cited by examiner

MICROWAVE DRYING DEVICE AND PROCESSING BOX THEREOF

BACKGROUND OF THE INVENTION

1. Field of the Invention

The present invention relates to a microwave drying device, especially to a continuous thin film microwave drying device that is adapted for roll-to-roll processes.

2. Description of the Prior Arts

Lithium-ion batteries are the mainstream choice for rechargeable electronics. A separator film is placed between an anode and a cathode of the lithium-ion battery. The separator film is a porous thin film made of polymeric material, nonwoven fabric, or ceramic. The function of the separator film is to keep the two electrodes apart to prevent electrical short circuits while also absorbing electrolytic solution and allowing the transport of ionic charge between the two electrodes. Performance of the lithium-ion battery is considerably dependent on the separator film.

To ensure the performance of the lithium-ion battery after assembling, the separator film needs to go through a drying process before adding the electrolytic solution. However, the conventional drying process for the separator film is time consuming. In a conventional drying process, the separator film, ceramic or non-ceramic, needs to be rested in a drying chamber for three days. Then, the separator film needs to be baked in a vacuum oven for another 8 hours for achieving a sufficient degree of drying. Therefore, the conventional drying process is very time consuming. Furthermore, because the separator film cannot resist high temperature, the temperature in the vacuum oven cannot exceed 100 degrees Celsius, which makes it difficult to shorten the duration of the drying process. Finally, sizes of the drying chamber and the vacuum oven are enormous and occupy too much space.

To overcome the shortcomings, the present invention provides a microwave drying device and a processing box thereof to mitigate or obviate the aforementioned problems.

SUMMARY OF THE INVENTION

The main objective of the present invention is to provide a microwave drying device and a processing box thereof that uses microwaves to heat up and dry a separator film uniformly and promptly such that the drying process of the separator film can be greatly accelerated.

The microwave drying device has a processing box, at least one suction module, and at least one microwave emitting module. The processing box is hollow and has two external conveying walls, an external mounting wall, an external sealing wall, at least one suction partition, and multiple channel partitions. The two external conveying walls are disposed apart from each other along a conveying direction. Each one of the external conveying walls has a box conveying opening. The external mounting wall is connected between the two external conveying walls and has two mounting openings. The two mounting openings are disposed apart from each other along the conveying direction. The external sealing wall is connected between the two external conveying walls. The external mounting wall and the external sealing wall are located on two opposite sides of the processing box respectively. The at least one suction partition is mounted in the processing box to divide an inner space of the processing box into a microwave drying space and at least one suction space. Multiple suction holes are formed through the at least one suction partition. The channel partitions are mounted in the microwave drying space. The channel partitions are disposed apart from each other along the conveying direction to form a wave travelling channel meandering and extending back and forth repeatedly in the microwave drying space. Two opposite ends of the wave travelling channel connect to the two mounting openings respectively. The suction holes of the at least one suction partition connect to the at least one suction space and the wave travelling channel. Each one of the channel partitions has a partition conveying opening. The partition conveying openings of the channel partitions and the two box conveying openings of the two external conveying walls are aligned. The at least one suction module connects to the at least one suction space. The at least one microwave emitting module is mounted on the external mounting wall of the processing box and emits microwaves toward the wave travelling channel.

When using the present invention, the substance to be dried is fed into the processing box through one of the box conveying openings. Then, the substance travels through the wave travelling channel, in which the substance is heated up and dried, through the partition conveying openings, and finally exits the processing box from the other box conveying opening.

The advantage of the present invention are as follows.

Firstly, the substance to be dried absorbs microwave energy when traveling through the wave travelling channel such that the substance is heated up and dried. Because microwaves can easily penetrate the substance and heats up outer and inner layers of the substance simultaneously, the present invention can considerably reduce the time it takes to dry the substance. Size of the present invention can also be reduced to save space.

Secondly, each segment of the wave travelling channel shares its side walls with adjacent segments, that is, each channel partition forms side walls of two segments simultaneously. Therefore, the wave travelling channel is formed using less material, which reduces weight and cost. Furthermore, the structure is more compact, which means the size of the present invention can be further reduced.

Thirdly, the two mounting openings are located on the same side of the processing box. As a result, even if two microwave emitting modules are mounted on the processing box, an overall width of the microwave drying device, which is defined as a dimension perpendicular to the conveying direction, is the same as an overall width of the microwave drying device having only one microwave emitting module. Therefore, the structure of the present invention is more compact when two microwave emitting modules are mounted, which further saves space.

Fourth, by forming the suction space via the suction partition, liquid vapor generated during the drying process can be removed from the processing box via the suction holes of the suction partition swiftly and uniformly, which improves drying efficacy.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
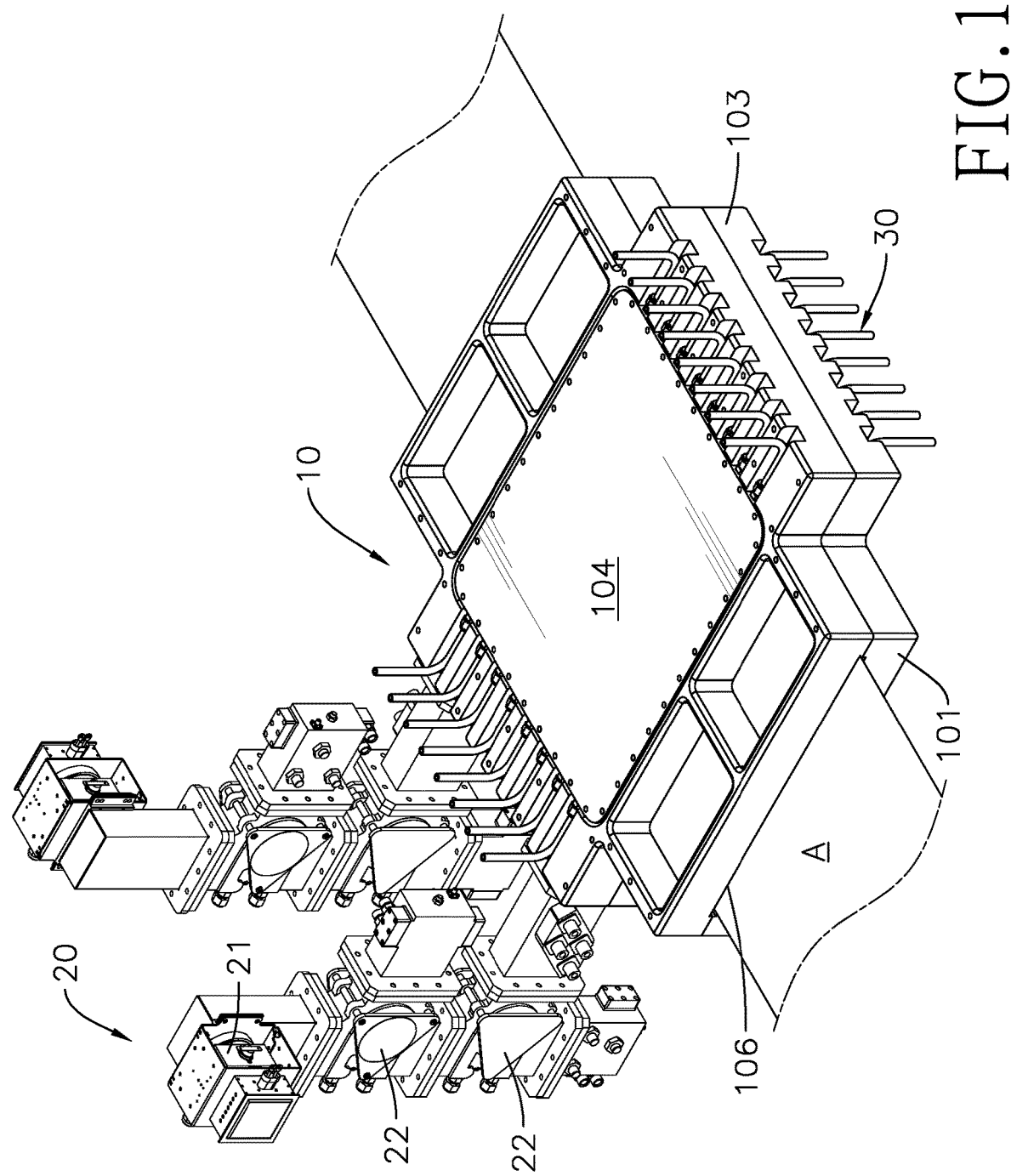
FIG. 1 is a perspective view of a microwave drying device in accordance with the present invention.
Figure 2:
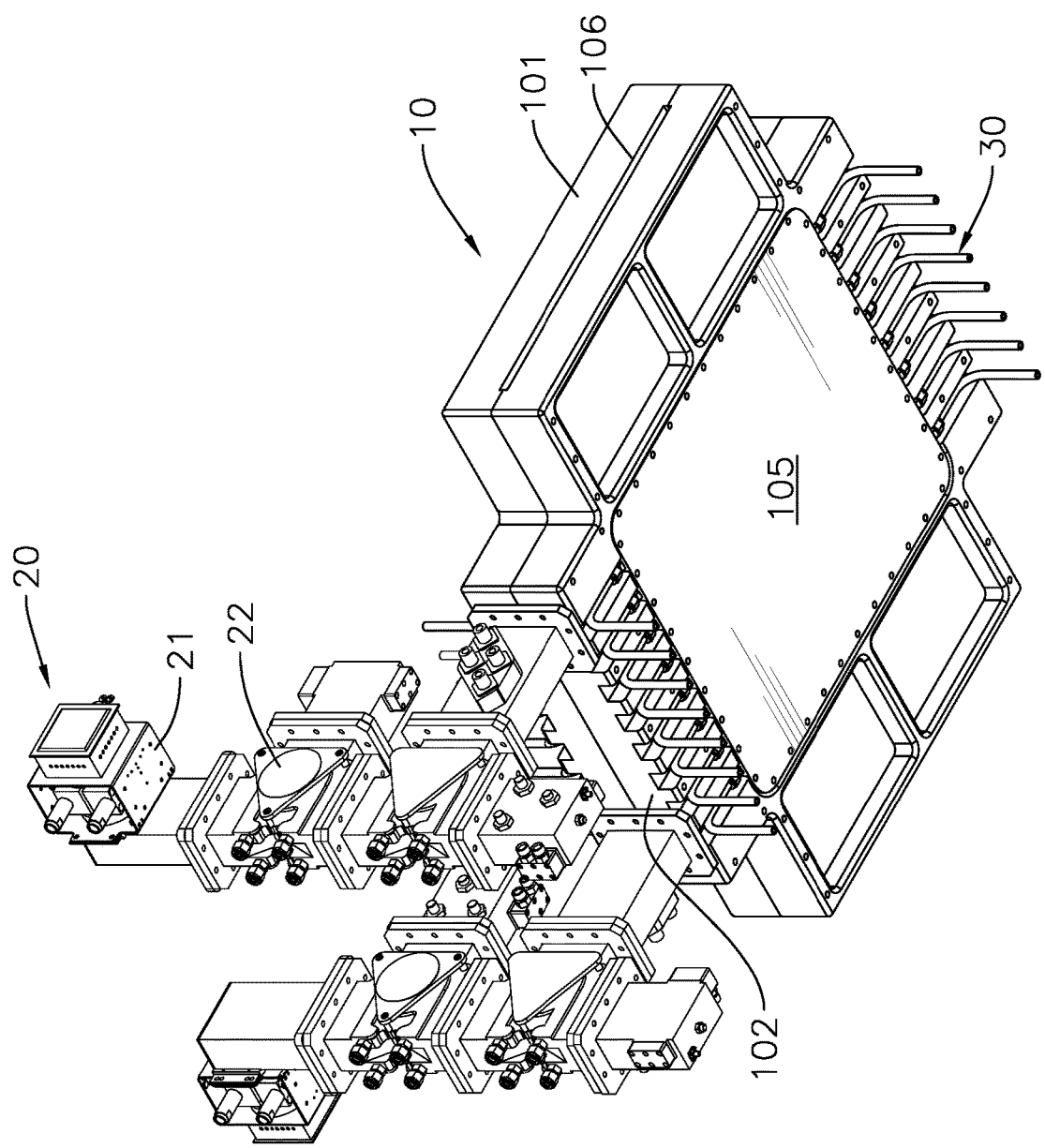
FIG. 2 is another perspective view of the microwave drying device in FIG. 1.

With reference to FIG. 1 and FIG. 2, a microwave drying device in accordance with the present invention comprises a processing box 10, two microwave emitting modules 20 and two suction modules 30. In a preferred embodiment, the present invention is adapted for drying a separator film A in a roll-to-roll process for producing lithium-ion batteries. In another preferred embodiment, the present invention can be adapted for processing all kinds of long and thin films. In still another preferred embodiment, the present invention can be adapted for drying items that are not long and thin films by integrating a conveyer belt.

With reference to FIGS. 1, 3, 5 and 7, the processing box 10 is hollow and has two external conveying walls 101, an external mounting wall 102, an external sealing wall 103, a top wall 104, a bottom wall 105, two suction partitions 11, and multiple channel partitions 12. In the preferred embodiment, the processing box 10 further has two microwave side plates 13. The two external conveying walls 101 are disposed apart from each other along a conveying direction D. Each one of the external conveying walls 101 has a box conveying opening 106 which is preferably elongated and narrow.

The external mounting wall 102 is connected between the two external conveying walls 101 and is preferably perpendicular to the two external conveying walls 101. The external mounting wall 102 has two mounting openings 107. The two mounting openings 107 are disposed apart from each other along the conveying direction D and located on the same side of the processing box 10.

Figure 3:
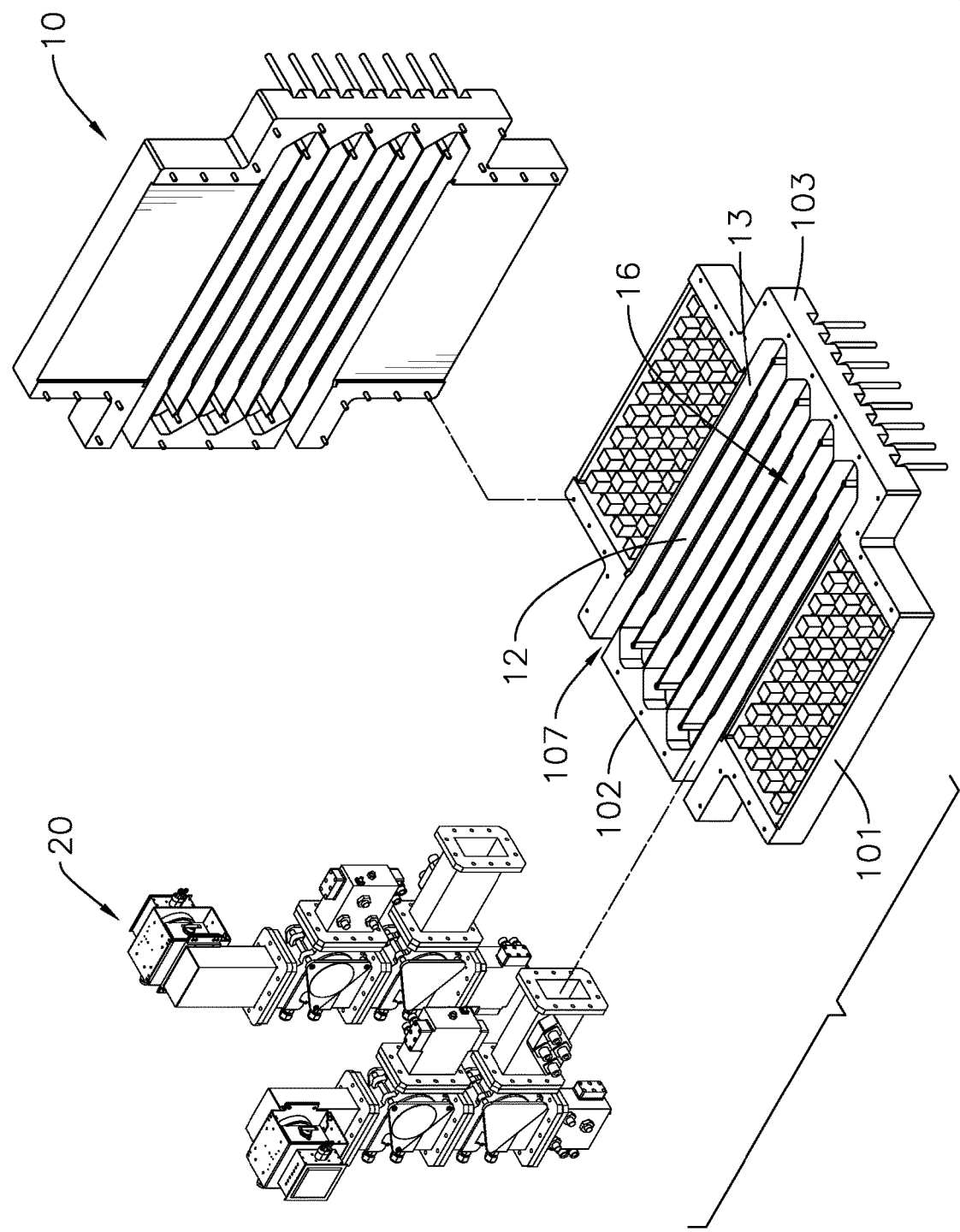
FIG. 3 is an exploded view of the microwave drying device in FIG. 1.

The external sealing wall 103 is connected between the two external conveying walls 101. The external mounting wall 102 and the external sealing wall 103 are located on two opposite sides of the processing box 10 respectively. In the preferred embodiment, two machined metal blocks that are substantially symmetric are assembled together to form the processing box 10 as shown in FIG. 3, and therefore most structures of the processing box 10 are formed after said two metal blocks are assembled.

Figure 4:
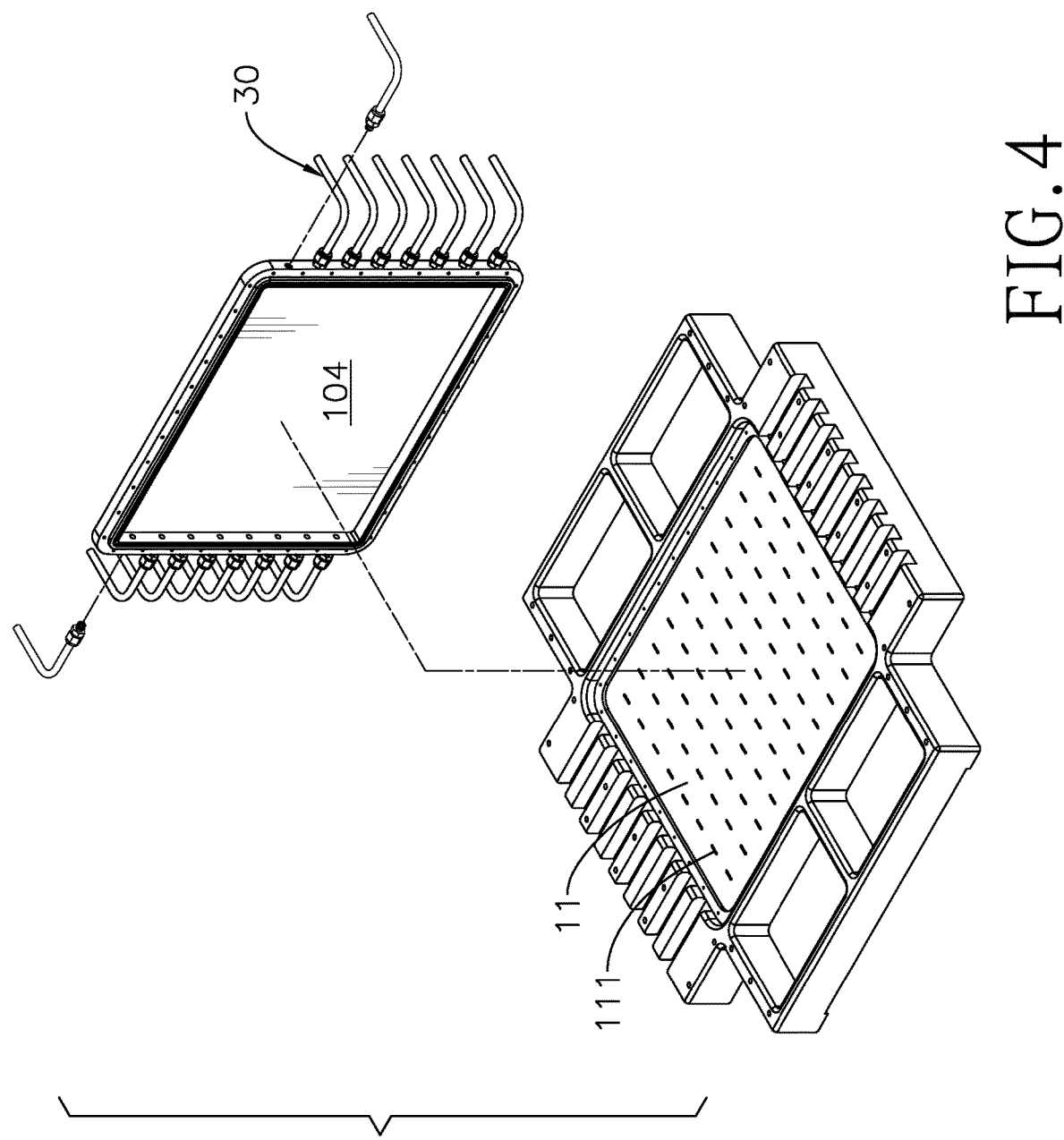
FIG. 4 is an exploded view of an upper half of the processing box of the microwave drying device.
Figure 7:
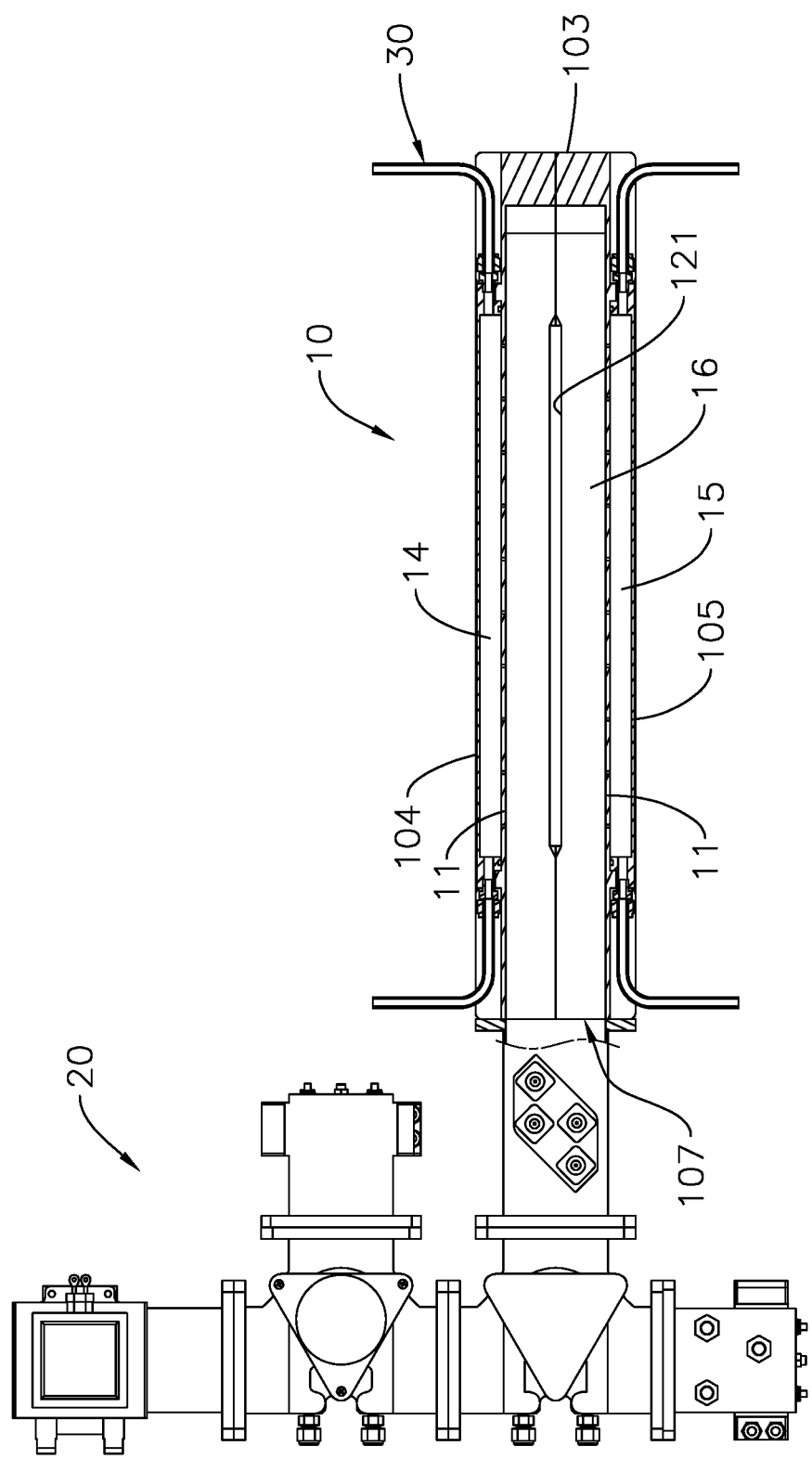
FIG. 7 is a side sectional view of the microwave drying device in FIG. 1.
Figure 8:
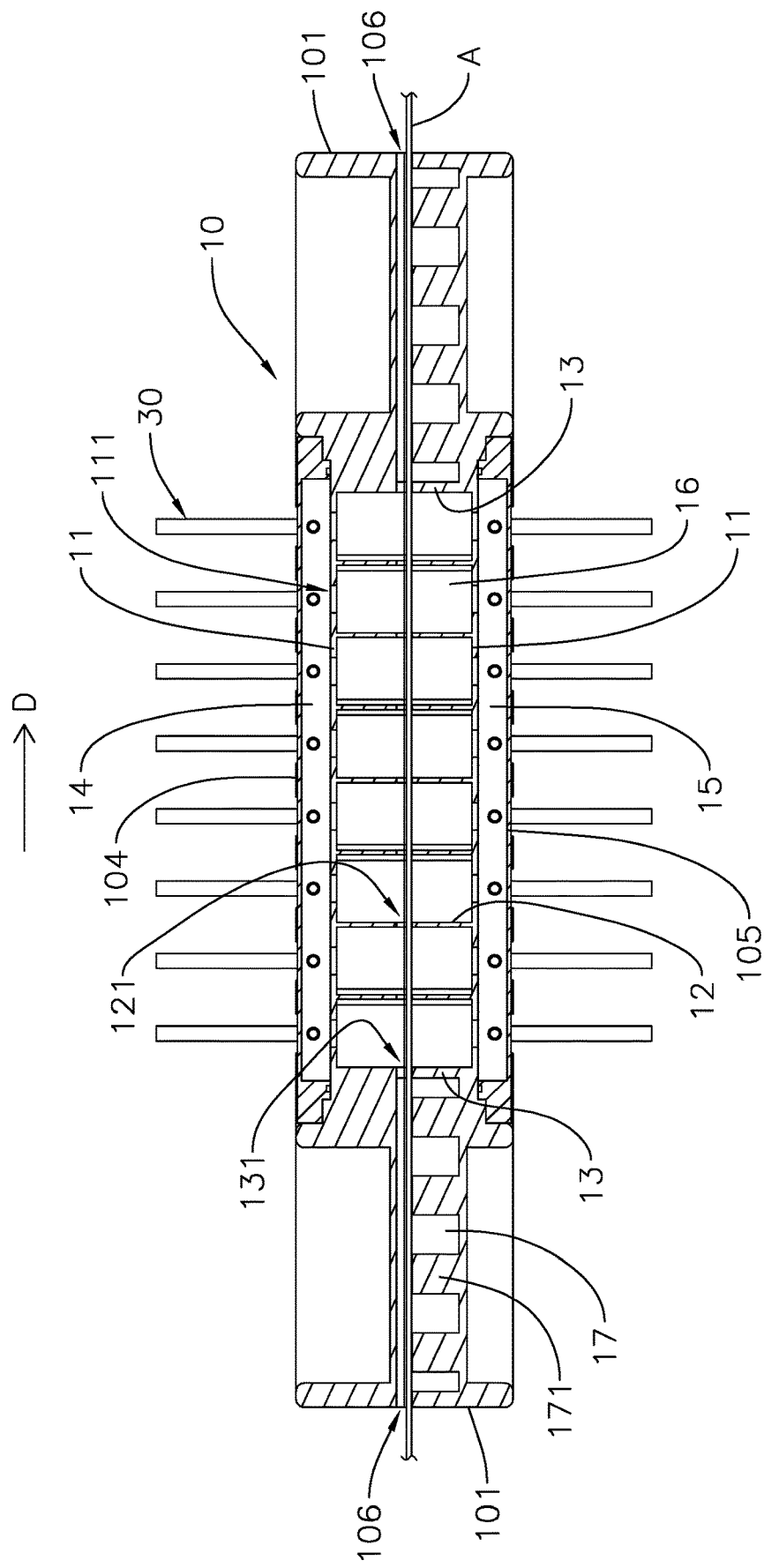
FIG. 8 is a side sectional view from a different direction of part of the microwave drying device in FIG. 1.

With reference to FIGS. 4, 7, and 8, two suction partitions 11 are mounted in the processing box 10 and disposed apart from each other vertically to divide an inner space of the processing box 10 into a microwave drying space 16 and two suction spaces. The two suction spaces are respectively an upper suction space 14 and a lower suction space 15. The microwave drying space 16 is formed between the two suction partitions 11 and located between the two suction spaces.

To be specific, one of the suction partitions 11 is disposed apart from the top wall 104 of the processing box 10 to form the upper suction space 14, and the other one of the suction partitions 11 is disposed apart from a bottom wall 105 of the processing box 10 to form the lower suction space 15. Multiple suction holes 111 are formed through each one of the suction partitions 11. The suction holes 111 are preferably narrow holes extending along the conveying direction D.

One of the two suction modules 30 connects to the upper suction space 14, and the other one of the two suction modules 30 connects to the lower suction space 15 such that liquid vapor inside the microwave drying space 16 can be removed via the suction holes 111 of the suction partitions 11 swiftly and uniformly. The suction module 30 is conventional; therefore only suction tubes of the suction module 30 is partially shown in the figures.

Figure 6:
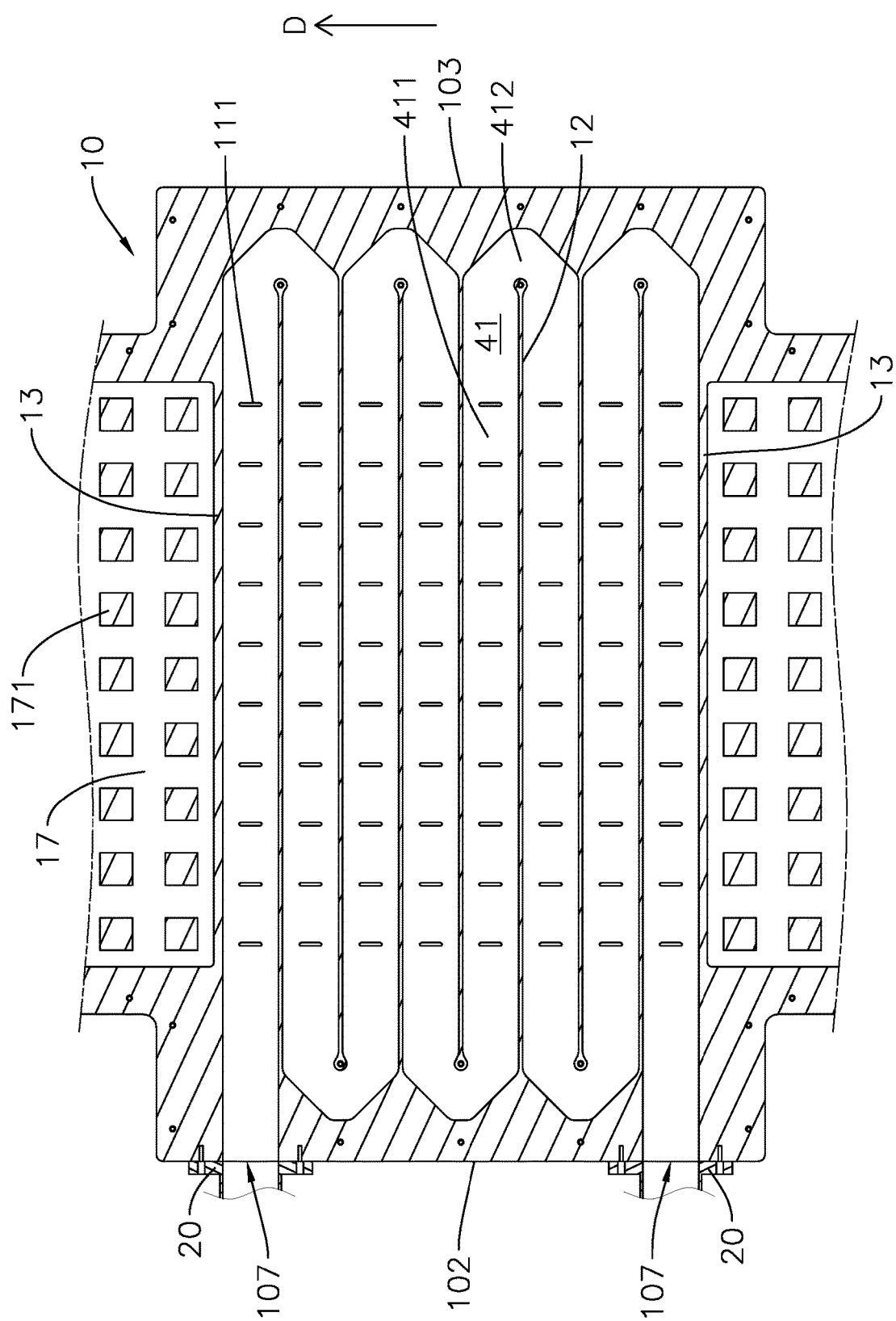
FIG. 6 is a top sectional view in partial section of the microwave drying device in FIG. 1.

With reference to FIGS. 3, 6, and 8, the two microwave side plates 13 are mounted in the processing box 10. The two microwave side plates 13 correspond to the two external conveying walls respectively. Each one of the two microwave side plates 13 is disposed apart from the corresponding external conveying wall 101 to form a microwave suppression space 17. Multiple microwave suppression elements 171 are mounted in each one of the microwave suppression space 17. In each one of the microwave suppression spaces 17, the microwave suppression elements 171 are, but not limited to, orderly arranged.

The microwave drying space 16 is formed between the two microwave side plates 13 and located between the two microwave suppression spaces 17. Each one of the microwave side plates 13 has a microwave conveying opening 131 (as shown in FIG. 8) connecting to the corresponding one of the microwave suppression spaces 17 and the microwave drying space 16. In other words, the microwave suppression spaces 17 are formed by having the microwave side plates 13 mounted between the microwave drying space 16 and the external conveying walls 101. Therefore, though microwaves in the microwave drying space 16 inevitably leaks out to the microwave suppression spaces 17 via the microwave conveying openings 131, the microwave suppression spaces 17 in combination with the microwave suppression elements 171 can prevent microwaves from further leaking out to the external environment via the box conveying openings 106 of the external conveying walls 101.

With reference to FIGS. 3, 6, and 8, the channel partitions 12 are mounted in the microwave drying space 16. The channel partitions 12 are disposed apart from each other along the conveying direction D to form a wave travelling channel 41. The wave travelling channel 41 meanders and extends back and forth repeatedly in the microwave drying space 16. Two opposite ends of the wave travelling channel 41 connect to the two mounting openings 107 respectively.

To be specific, each one of the channel partitions 12 is an elongated plate perpendicular to the conveying direction D. Half of the channel partitions 12 are connected to the external mounting wall 102 and disposed apart from the external sealing wall 103, such that said half of the channel partitions 12 can be seen as protruding from the external mounting wall 102 and extending toward the external sealing wall 103. The other half of the channel partitions 12 are connected to the external sealing wall 103 and disposed apart from the external mounting wall 102, such that said half of the channel partitions 12 can be seen as protruding from the external sealing wall 103 and extending toward the external mounting wall 102.

The wave travelling channel 41 has, but not limited to, multiple straight segments 411 and multiple connecting segments 412 which are defined by the channel partitions 12.

The straight segments 411 are parallel to each other and arranged along the conveying direction D. Each one of the connecting segments 412 connects two adjacent ones of the straight segments 411, and to be precise, each one of the connecting segments 412 connects an end of one of two adjacent ones of the straight segments 411 and an end of the other one of said two adjacent ones of the straight segments 411. In the preferred embodiment, the two suction partitions 11 form respectively a top surface and a bottom of the wave travelling channel 41.

With reference to FIGS. 3, 7, and 8, each one of the channel partitions 12 has a partition conveying opening 121 which is preferably elongated and narrow. One of the two box conveying openings 106, one of the two microwave conveying openings 131, the partition conveying opening 121, the other one of the two microwave conveying openings 131, and the other one of the two box conveying openings 106 are aligned and arranged orderly for the separator film A to travel through. Besides, the aforementioned conveying openings 106, 131, 121 are preferably elongated and narrow. In addition, the suction holes 111 of each one of the suction partitions 11 connect to the corresponding suction space and the wave travelling channel 41.

Figure 5:
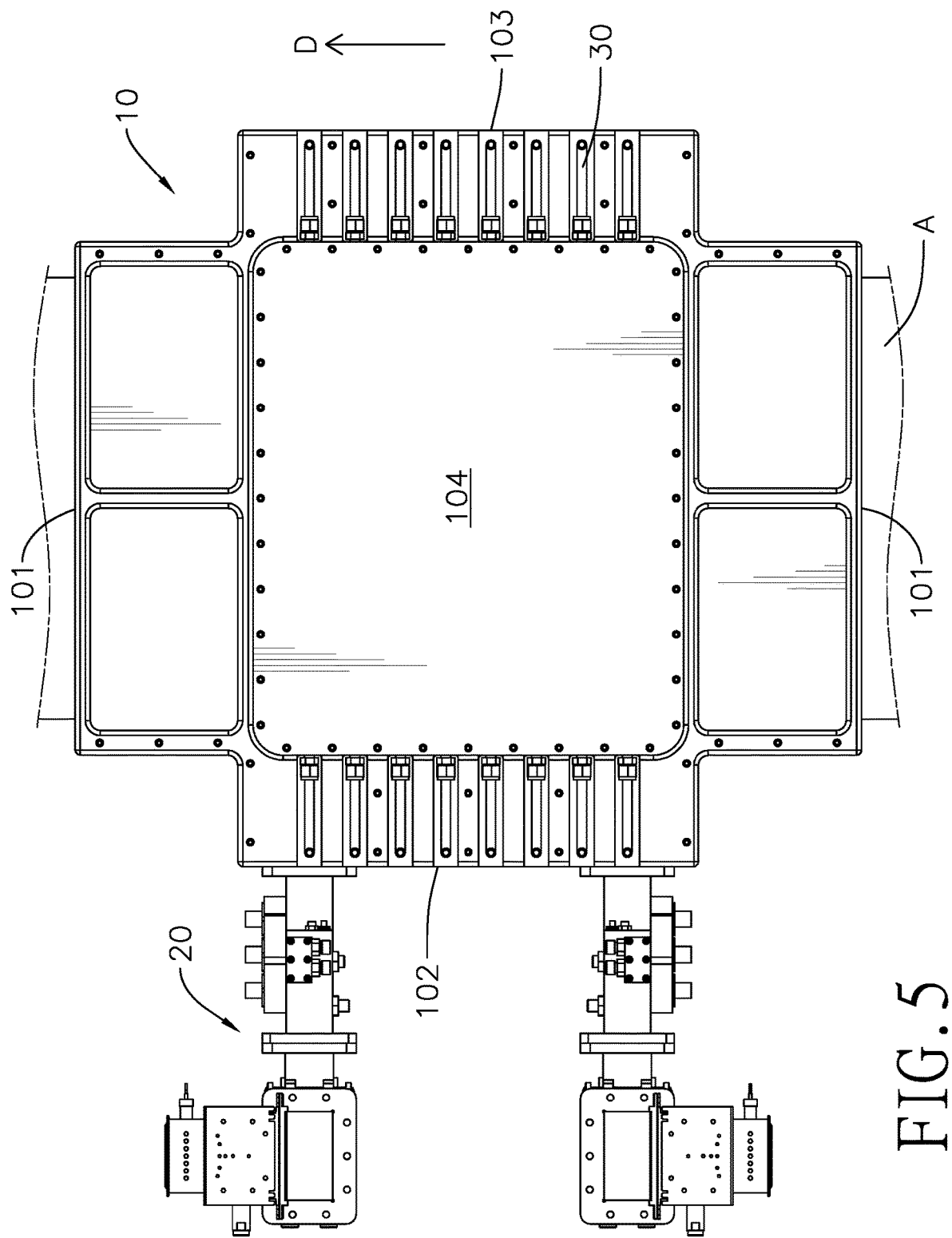
FIG. 5 is a top view of the microwave drying device in FIG. 1.

With reference to FIGS. 1, 5, and 6, two microwave emitting modules 20 are mounted on the external mounting wall 102 of the processing box 10, and emit microwaves toward the wave travelling channel 41 via the two mounting openings 107 respectively. The microwaves emitted by the microwave emitting module 20 form traveling waves in the wave travelling channel 41, such that the separator film A can be dried uniformly along a width of the separator film A. In another preferred embodiment that requires less drying capacity, a number of the microwave emitting module 20 can be one, and the microwave emitting module 20 emits microwaves toward one of the two mounting openings 107.

Furthermore, based on experimental evidences, when two microwave emitting modules 20 are mounted on the two ends of the wave travelling channel 41 respectively, the microwaves emitted by two microwave emitting modules 20 easily interfere with each other, resulting in phase locking. Stationary waves are formed in the wave travelling channel 41 due to phase locking, which affects uniformity of drying of the separator film A.

To mitigate phase locking and to ensure uniformity of drying, the two microwave emitting modules 20 emit microwaves of different frequencies. To achieve better performance, one of the two microwave emitting modules 20 in the preferred embodiment emits microwaves with frequencies from 2455 to 2465 MHz (Mega Hertz), while the other one of the two microwave emitting modules 20 emits microwaves with frequencies from 2435 to 2445 MHz. In another preferred embodiment, where there is only one microwave emitting module 20, the frequencies of the microwaves are preferably from 2420 to 2480 Mhz.

In the preferred embodiment, each one of the two microwave emitting modules 20 has a microwave source 21 and two circulators 22. The two circulators 22 are serially mounted between the microwave source 21 and the corresponding mounting opening 107. The circulators 22 of one of the microwave emitting modules 20 absorb the microwaves emitted by the microwave source 21 mounted on the other end of the wave travelling channel 41. As a result, the circulators 22 isolate the two microwave sources 21 of the two microwave emitting modules 20, which protects the microwave sources 21 and mitigates phase locking.

Based on experimental evidences, phase locking is almost eliminated when the circulators 22 of one of the microwave emitting modules 20 provide an overall isolation of more than negative 40 dB from the corresponding mounting opening 107 to the corresponding microwave source 21 while the frequencies of the two microwave sources 21 are properly staggered. However, the isolation provided by a standard commerce grade circulator 22 is roughly negative 23 dB, and therefore each microwave emitting module 20 in the preferred embodiment has two circulators 22 serially connected to provide an overall isolation of more than negative 40 dB.

When one single circulator 22 provides an isolation of more than negative 40 dB, a microwave emitting module 20 needs only one circulator 22. In the preferred embodiment where there is only one microwave emitting module 20, only one commerce grade circulator 22 is sufficient because phase locking is not an issue.

With reference to FIGS. 1, 5 and 8, when using the present invention, insert the separator film A through the processing box 10 along the conveying direction and properly straighten the separator film A. Then, activate the suction modules 30, the microwave emitting modules 20 in order, and finally begin conveying the separator film A. The microwaves emitted by the microwave emitting modules 20 evaporate liquid in the separator film A to dry the separator film A. Liquid vapor generated during the drying process is removed by the suction modules 30 via the suction holes 111 and the suction spaces 14, 15.

Based on experimental results, a drying capacity of the present invention is roughly 10 meters per minute, which greatly improves the drying speed of the separator film A. The drying speed can be further increased by adding more of the straight segments 411 to the wave travelling channel 41. The drying speed increases proportionally as the straight segments 411 increases.

Another one of the advantages of the present invention is that by having the two suction partitions 11 mounted on top and bottom of the microwave drying space 16 respectively, suction forces on two opposite surfaces of the separator film A are substantially same when the two suction modules 30 operate, therefore preventing rubbing between the separator film A and the processing box 10 due to displacement and deformation of the separator film A caused by imbalanced suction forces. In another preferred embodiments, there can be only one suction partition 11 and one suction space. A number of the microwave drying space 16 is one in spite of the number of the suction partition 11 being one or plural.

To sum up, the present invention greatly increases drying speed by using microwaves to dry the separator film A. Furthermore, by forming the meandering wave travelling channel 41 using the channel partitions 12, and disposing the two mounting openings 107 on the same side of the processing box 10, the structure of the present invention is more compact, which saves space, reduces weight and reduces cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A microwave drying device comprising:
a processing box being hollow and having:
two external conveying walls disposed apart from each other along a conveying direction; each one of the external conveying walls having a box conveying opening;
an external mounting wall connected between the two external conveying walls and having two mounting openings; the two mounting openings disposed apart from each other along the conveying direction;
an external sealing wall connected between the two external conveying walls; the external mounting wall and the external sealing wall located on two opposite sides of the processing box respectively;
at least one suction partition mounted in the processing box to divide an inner space of the processing box into a microwave drying space and at least one suction space; multiple suction holes formed through the at least one suction partition; and
multiple channel partitions mounted in the microwave drying space; the channel partitions disposed apart from each other along the conveying direction to form a wave travelling channel meandering and extending back and forth repeatedly in the microwave drying space; two opposite ends of the wave travelling channel connecting to the two mounting openings respectively; the suction holes of the at least one suction partition connecting to the at least one suction space and the wave travelling channel; each one of the channel partitions having:
a partition conveying opening; the partition conveying openings of the channel partitions and the two box conveying openings of the two external conveying walls being aligned;
at least one suction module connecting to the at least one suction space; and
at least one microwave emitting module mounted on the external mounting wall of the processing box and emitting microwaves toward the wave travelling channel.

2. The microwave drying device as claimed in claim 1, wherein a number of the at least one microwave emitting module is two; the two microwave emitting modules emit microwaves toward the two mounting openings respectively.

3. The microwave drying device as claimed in claim 2, wherein the two microwave emitting modules emit microwaves of different frequencies.

4. The microwave drying device as claimed in claim 3, wherein one of the two microwave emitting modules emits microwaves with frequencies from 2455 to 2465 Mhz; the other one of the two microwave emitting modules emits microwaves with frequencies from 2435 to 2445 Mhz.

5. The microwave drying device as claimed in claim 4, wherein each one of the two microwave emitting modules has:
a microwave source; and
at least one circulator serially connected between the microwave source and the corresponding mounting opening; the at least one circulator providing an isolation of more than 40 dB from said mounting opening to the microwave source.

6. The microwave drying device as claimed in claim 2, wherein each one of the two microwave emitting modules has:
a microwave source; and
at least one circulator serially connected between the microwave source and the corresponding mounting opening; the at least one circulator providing an isolation of more than 40 dB from said mounting opening to the microwave source.

7. The microwave drying device as claimed in claim 5, wherein
a number of the at least one suction partition is two; a number of the at least one suction space is two; the two suction partitions are disposed apart from each other vertically; the microwave drying space is formed between the two suction partitions and located between the two suction spaces; and
a number of the at least one suction module is two; the two suction modules connect to the two suction spaces respectively.

8. The microwave drying device as claimed in claim 7, wherein the processing box further has:
two microwave side plates mounted in the processing box; the two microwave side plates corresponding to the two external conveying walls respectively; each one of the microwave side plates disposed apart from the corresponding external conveying wall to form a microwave suppression space; the microwave drying space formed between the two microwave side plates and located between the two microwave suppression spaces formed by the two microwave side plates respectively; each one of the microwave side plates having:
a microwave conveying opening connecting to the corresponding microwave suppression space and the microwave drying space; wherein the two microwave conveying openings of the two microwave side plates, the partition conveying openings of the channel partitions, and the two box conveying openings of the two external conveying walls are aligned; multiple microwave suppression elements mounted in each one of the microwave suppression spaces.

9. The microwave drying device as claimed in claim 8, wherein the partition conveying openings are elongated and narrow.

10. The microwave drying device as claimed in claim 9, wherein the wave travelling channel has:
multiple straight segments parallel to each other and arranged along the conveying direction; and
multiple connecting segments; each one of the connecting segments connecting two adjacent ones of the straight segments.

11. The microwave drying device as claimed in claim 1, wherein
a number of the at least one suction partition is two; a number of the at least one suction space is two; the two suction partitions are disposed apart from each other vertically; the microwave drying space is formed between the two suction partitions and located between the two suction spaces; and
a number of the at least one suction module is two; the two suction modules connect to the two suction spaces respectively.

12. The microwave drying device as claimed in claim 1, wherein the processing box further has:

two microwave side plates mounted in the processing box; the two microwave side plates corresponding to the two external conveying walls respectively; each one of the microwave side plates disposed apart from the corresponding external conveying wall to form a microwave suppression space; the microwave drying space formed between the two microwave side plates and located between the two microwave suppression spaces formed by the two microwave side plates respectively; each one of the microwave side plates having:

a microwave conveying opening connecting to the corresponding microwave suppression space and the microwave drying space; wherein the two microwave conveying openings of the two microwave side plates, the partition conveying openings of the channel partitions, and the two box conveying openings of the two external conveying walls are aligned; and multiple microwave suppression elements mounted in each one of the microwave suppression spaces.

13. The microwave drying device as claimed in claim 1, wherein the partition conveying openings are elongated and narrow.

14. The microwave drying device as claimed in claim 1, wherein the wave travelling channel has:

multiple straight segments parallel to each other and arranged along the conveying direction; and multiple connecting segments; each one of the connecting segments connecting two adjacent ones of the straight segments.

15. A processing box of a microwave drying device, being hollow and having:

two external conveying walls disposed apart from each other along a conveying direction; each one of the external conveying walls having a box conveying opening;

an external mounting wall connected between the two external conveying walls and having two mounting openings; the two mounting openings disposed apart from each other along the conveying direction;

an external sealing wall connected between the two external conveying walls; the external mounting wall and the external sealing wall located on two opposite sides of the processing box respectively;

at least one suction partition mounted in the processing box to divide an inner space of the processing box into a microwave drying space and at least one suction space; multiple suction holes formed through the at least one suction partition; and multiple channel partitions mounted in the microwave drying space; the channel partitions disposed apart from each other along the conveying direction to form a wave travelling channel meandering and extending back and forth repeatedly in the microwave drying space; two opposite ends of the wave travelling channel connecting to the two mounting openings respectively; the suction holes of the at least one suction partition connecting to the at least one suction space and the wave travelling channel; each one of the channel partitions having:

a partition conveying opening; the partition conveying openings of the channel partitions and the two box conveying openings of the two external conveying walls being aligned.

* * * * *